United States Patent
Iordache (10) Patent No.: US 8,110,766 B2
(45) Date of Patent: Feb. 7, 2012

(54) SWITCH ATTACHMENT ASSEMBLY

(75) Inventor: Lucian Iordache, Woodbridge (CA)

(73) Assignee: Omron Dualtec Automotive Electronics Inc., Oakville (CA)

( * ) Notice: Subject to any disclaimer, the term of this patent is extended or adjusted under 35 U.S.C. 154(b) by 381 days.

(21) Appl. No.: 12/472,734

(22) Filed: May 27, 2009

(65) Prior Publication Data

US 2010/0006411 A1 Jan. 14, 2010

Related U.S. Application Data

(60) Provisional application No. 61/079,232, filed on Jul. 9, 2008.

(51) Int. Cl.
*H01H 19/14* (2006.01)
(52) U.S. Cl. .................................. 200/564; 200/296
(58) Field of Classification Search .................. 200/564, 200/566, 336, 567, 296
See application file for complete search history.

(56) References Cited

U.S. PATENT DOCUMENTS

| | | | |
|---|---|---|---|
| 3,394,403 A * | 7/1968 | Dennison | 200/314 |
| 3,571,548 A | 3/1971 | Osika | |
| 3,780,245 A | 12/1973 | Beddow | |
| 3,800,113 A | 3/1974 | Sheahan | |
| 3,924,942 A * | 12/1975 | Yamada et al. | 353/25 |
| 4,004,120 A | 1/1977 | Lee | |
| 4,315,123 A * | 2/1982 | Fujita et al. | 200/296 |
| 4,549,050 A * | 10/1985 | Lang | 200/314 |
| 4,673,780 A | 6/1987 | Kenway | |
| 4,751,355 A | 6/1988 | Wisskirchen et al. | |
| 4,857,677 A * | 8/1989 | Tanaka et al. | 200/5 R |
| 5,527,991 A | 6/1996 | Sadowski et al. | |
| 5,631,454 A * | 5/1997 | Hubacher et al. | 200/296 |
| 5,687,834 A | 11/1997 | Simon et al. | |
| 5,954,192 A | 9/1999 | Iitsuka | |
| 6,005,308 A * | 12/1999 | Bryde et al. | 200/339 |
| 6,080,942 A | 6/2000 | Sasaki | |
| 6,102,394 A * | 8/2000 | Wurz et al. | 200/296 |
| 6,281,453 B1 * | 8/2001 | Uleski | 200/336 |
| 6,410,871 B1 * | 6/2002 | Rarbach | 200/336 |
| 6,739,882 B2 | 5/2004 | Fuehrer et al. | |
| 6,787,717 B2 | 9/2004 | Jorczak | |
| 7,173,185 B1 | 2/2007 | Cloran et al. | |
| 7,300,189 B2 | 11/2007 | England et al. | |
| 7,307,232 B2 * | 12/2007 | Altmann et al. | 200/564 |
| 2006/0243574 A1 | 11/2006 | Blake, III | |

FOREIGN PATENT DOCUMENTS

EP 0726629 B1 8/1999

OTHER PUBLICATIONS

Hijazi. M.: International Search Report from corresponding PCT Application No. PCT/CA2009/000707; completed Sep. 25, 2009.

\* cited by examiner

*Primary Examiner* — Briggitte R Hammond
(74) *Attorney, Agent, or Firm* — Brett J. Slaney; John R. S. Olange; Blake Cassels & Graydon LLP (57) ABSTRACT

An assembly for installation of a switch in the dashboard of a vehicle without the use of any tools. The assembly comprises a housing, a resilient member such as a washer spring, and a bezel. The switch is secured to the housing and subsequently inserted into the bezel which is integrated with the dashboard. The installation of the switch, which is secured to the housing is then completed through the interaction of a profiled wall on the bezel and a flange on the housing with the washer spring interposed between.

19 Claims, 9 Drawing Sheets

SWITCH ATTACHMENT ASSEMBLY

This application claims priority from U.S. Application No. 61/079,232 filed Jul. 9, 2008, the contents of which are incorporated herein by reference.

FIELD OF THE INVENTION

The present invention relates generally to switch assemblies, and has particular utility in facilitating installation and removal of switches into and out of another structure.

BACKGROUND

In a vehicle, rotary switches are often used to control the functionality of side lights, low beams, fog headlights and other similar applications. Rotary switches are also commonly installed in the panels of domestic appliances to control settings, for instance, the wash settings in a washing machine. These rotary switches are typically installed in a bezel integrated into the dashboard or a panel and thus removal of the switch for repair or replacement may also require removal of the dashboard or a panel. Moreover, such removal may require the use of a special tool or require additional equipment.

It is therefore an object of the following to address the above-noted disadvantages.

SUMMARY OF THE INVENTION

In one aspect, there is provided s switch attachment assembly for facilitating installation and removal of a switch from a panel comprising: a bezel configured to be integrated into the panel, the bezel comprising a circular aperture; and a cylindrical switch housing configured to support the switch, the housing sized to be received through the aperture; wherein the aperture and the housing comprise complementary flanges to limit axial movement of the housing through the aperture, the assembly further comprising a resilient member interposed between the flanges; wherein one of the bezel or the housing comprises a profiled portion and the other of the bezel or the housing comprises at least one protrusion to interact with the profiled portion during rotation of the housing when inserted into the aperture to secure the housing in the bezel; wherein the resilient member stabilizes the housing with respect to the bezel when secured in the bezel.

In another aspect, there is provided a cylindrical switch housing configured to support a switch, the housing for installing and removing the switch from a bezel integrated into a panel, the housing sized to be received through a circular aperture in the bezel and comprising a flange for interacting with a complementary flange on the bezel to limit axial movement of the housing through the aperture, the housing comprising at least one protrusion for interacting with a profiled portion on the bezel during rotation of the housing when inserted into the aperture to secure the housing in the bezel.

In yet another aspect, there is provided a bezel configured to be integrated in a panel, the bezel comprising a circular aperture sized to receive a cylindrical switch housing configured to support a switch, the bezel for enabling installation and removal of the housing from the panel, the bezel comprising a flange for interacting with a complementary flange on the housing to limit axial movement of the housing through the aperture, the bezel comprising a profiled portion for interacting with at least one protrusion on the housing during rotation of the housing when inserted into the aperture to secure the housing in the bezel.

BRIEF DESCRIPTION OF THE DRAWINGS

Embodiments of the invention will now be described by way of example only with reference to the appended drawings wherein.

DETAILED DESCRIPTION

As noted above, switches, and in particular rotary type switches are widely used in vehicles for operating features such as the headlamps and temperature controls. Rotary switches are often installed in an opening of a dashboard or other structure during manufacture of a vehicle. Thereafter, if the switch needs to be removed for repair or replacement, it is often necessary to remove a portion of or even the entire dashboard. During this process, other elements on the dashboard may also need to be removed and then later reinstalled.

It has been recognized that to facilitate the installation and removal of a switch housing into and out of a structure such as a dashboard or generally a "panel", a housing can be provided that interacts with a bezel integrated into the panel, with a resilient member therebetween such as a washer spring. It has been found that the following switch attachment assembly enables a simple, quick and reliable installation of a switch into a dashboard and similarly facilitates an easy removal of the switch from the dashboard without requiring any special tools.

As will be explained in greater detail below, the assembly locates a switch in the housing through an opening in the housing. The other end of the switch directed towards the dashboard may at the same time be connected to a wire harness to connect the switch to the vehicle's electrical and communications systems. The switch, located in the housing may then be inserted into a circular aperture in the bezel, which is integrated with a portion of the dashboard or an insert therefor. A bayonet-type mounting mechanism is then provided by way of a profiled portion, e.g. a circumferential wall, whereby rotation of the housing with respect to the bezel is guided by a set of slots, notches and posts to an installed position where the switch is secured in the bezel and oriented in the desired position. The resilient member is interposed between complementary flanges of the housing and the bezel to fit the housing against the bezel in the installed position to inhibit rattling or other undesirable noises.

Figure 1A:
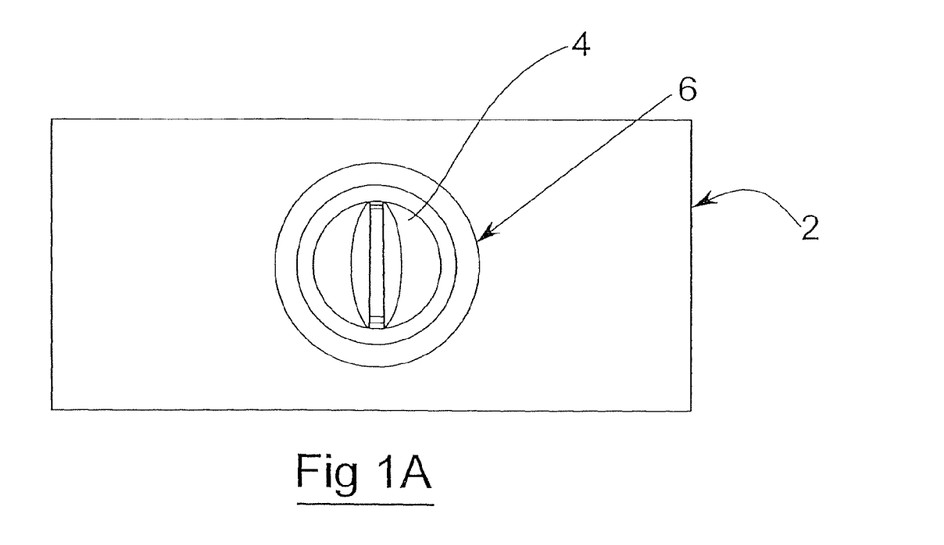
FIGS. 1a and 1b show a dashboard and a switch knob in different views.
Figure 1B:
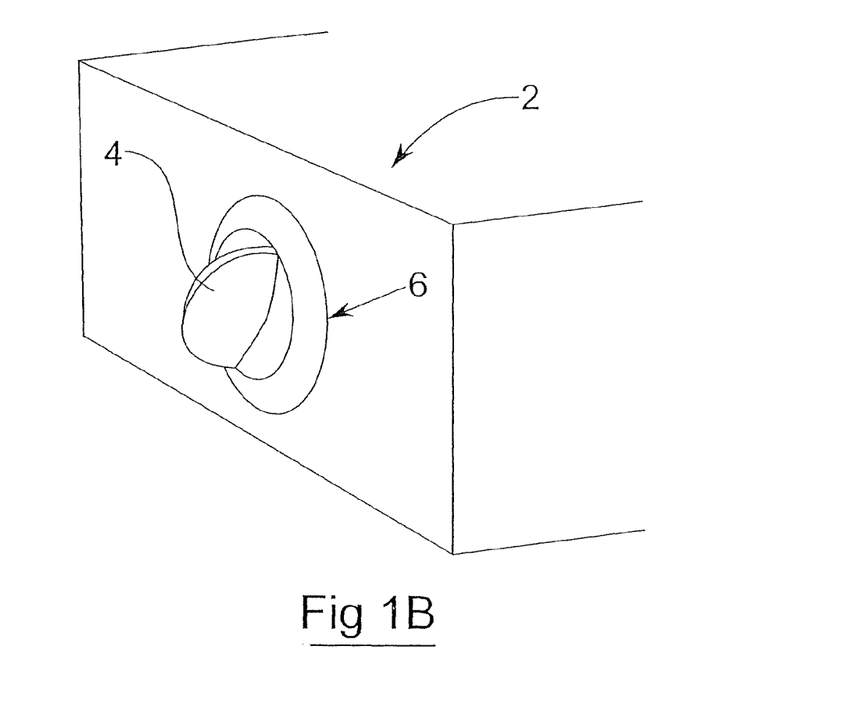

Turning now to the drawings, FIGS. 1a and 1b show a knob 4 for a rotary switch 12, installed in a bezel 6, which is integrated into a dashboard or a panel 2 of a vehicle. It may be noted that in FIGS. 1a and 1b, the switch 12 is concealed by the panel 2 and is operated by the knob 4 as would be well understood by a person skilled in the art.

Figure 2:
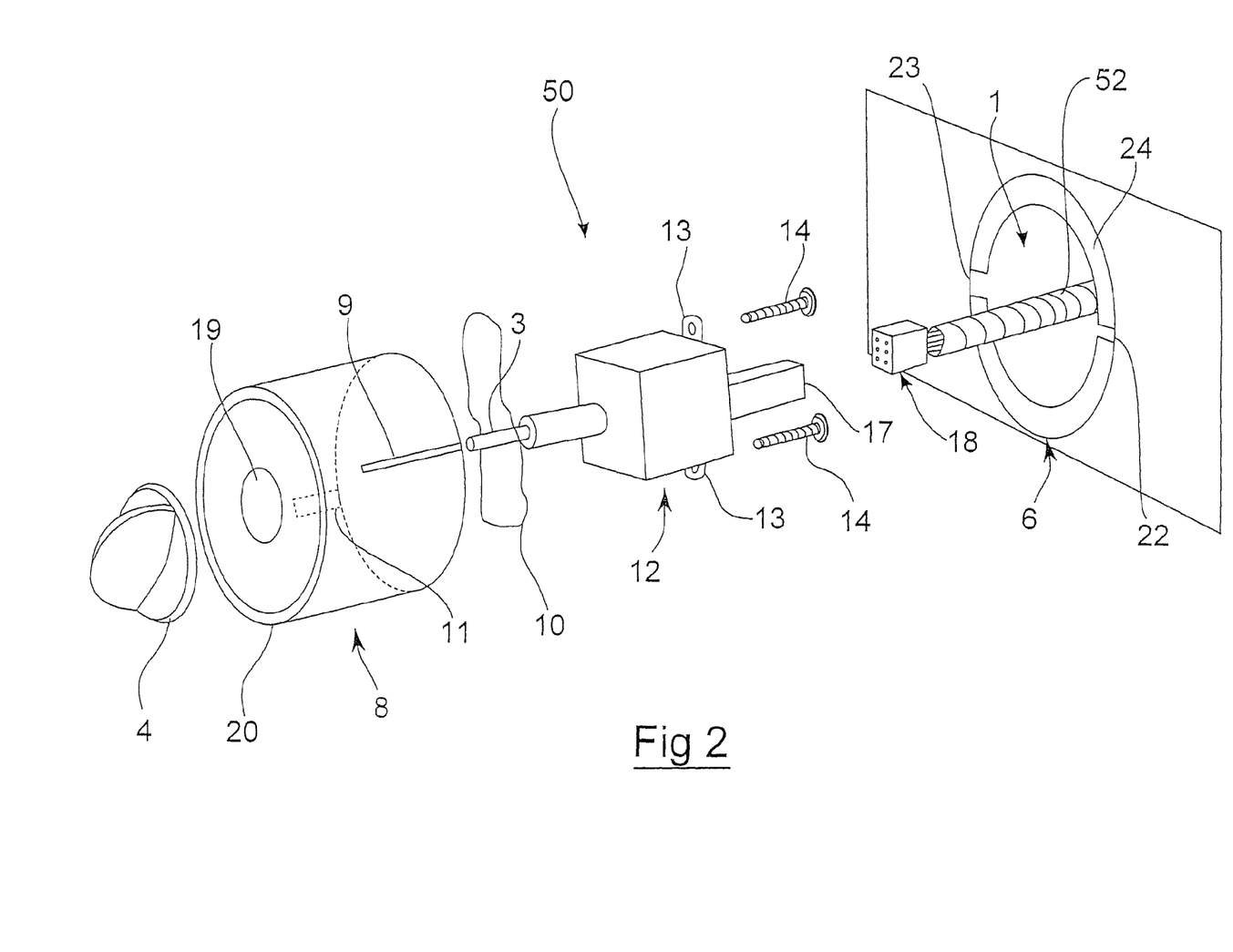
FIG. 2 is an exploded perspective view of a switch assembly and a portion of the dashboard.

An exploded view of an exemplary switch assembly 50, which utilizes the aforementioned housing, bezel and resilient member is shown in FIG. 2. It can be seen that the bezel 6 in this example is formed as a portion of the panel 2 and comprises a circular aperture or opening 1 through which a wiring harness 52 may extend such that a connector 18 can mate with a corresponding connector 17 on the switch 12. The bezel 6 comprises a pair of differently sized slots formed in a landing 24, a first narrow slot 22 and second wide slot 23. The slots 22, 23 permit the housing 8 to fit into the dashboard or panel 2. The switch 12 comprises a shaft 3 at one end for supporting the knob 4 to permit the knob 4 to operate the switch, and the connector 17 at the other end. The connector 18 at one end of the wiring harness 52 can be attached to the complementary mating connector 17 on the switch 12. The wiring harness 52 is typically connected to a central controller or other portion of the vehicle's electrical system to enable the switch 12 to operate a feature in the vehicle.

The switch 12 in this example also comprises a pair of screw supports 13 for securing the switch 12 to the housing 8 using a pair of screws 14. It will be appreciated that the switch may be secured to the housing 8 in any suitable fashion and the screws 14 are shown for the sake of illustration only. As would be understood by a person skilled in the art, the switch 12 would also include other functional elements which would vary according to the nature of the feature being controlled by the switch 12 and thus details thereof need not be explained. The shaft 3 of the switch 12 extends through an opening 19 in the housing 8 for receiving the knob 4. The housing 8 comprises a flange 20 and a pair of ribs, a first narrow rib 9 that is sized to fit through the narrow slot 22 and a second wide rib 11 that is sized to fit through the wide slot 23 of the bezel 6. A resilient member, which in this example is a wavy washer type spring denoted by numeral 10, is interposed between the flange 20 of the housing 8 and the landing 24 of the bezel 6 to provide resiliency between the members. In this example, the wavy washer type spring is sized according to the circumference of the housing and so as to extend no further than the extent of the flange 20 of the housing 8.

Figure 3:
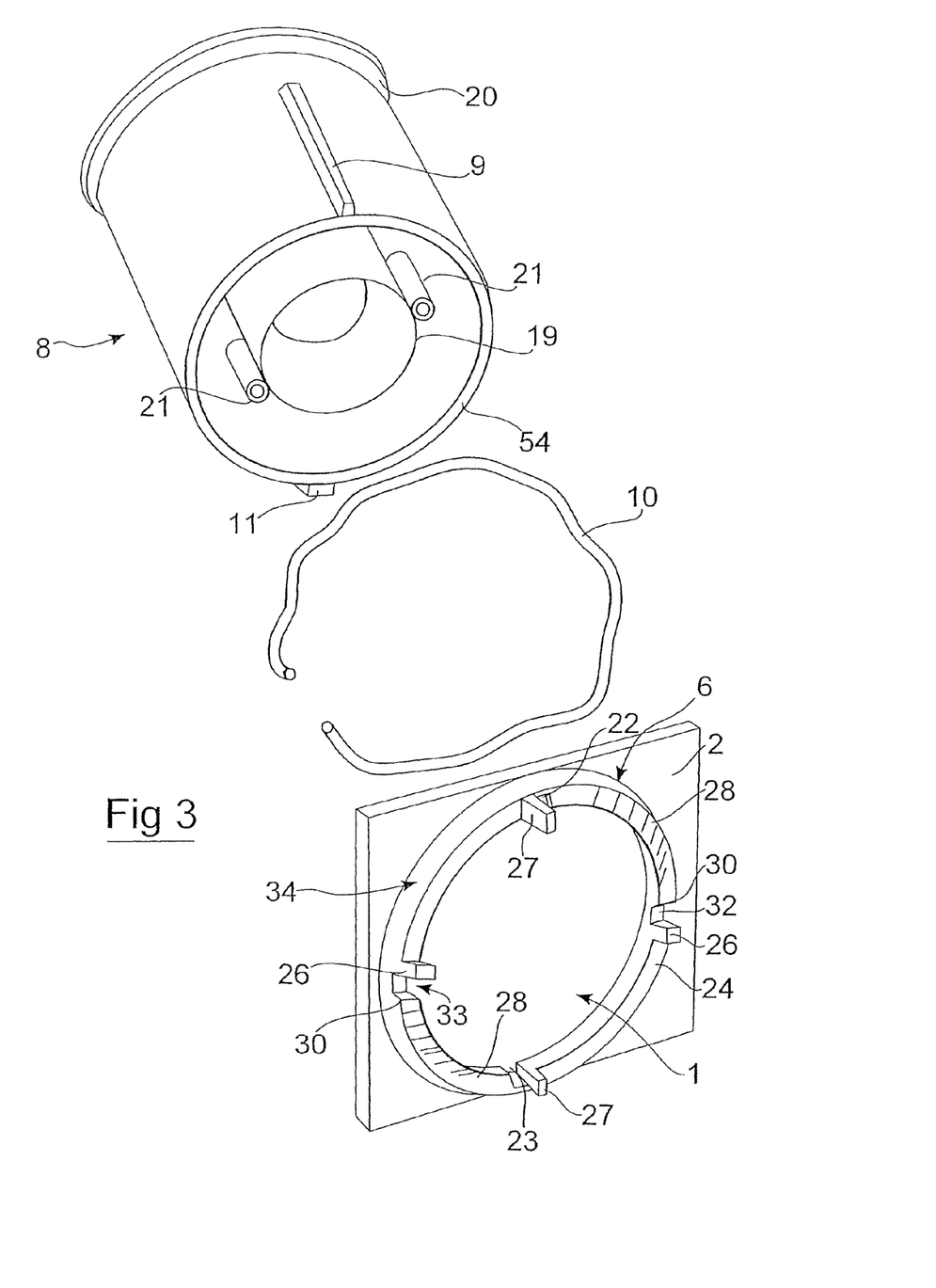
FIG. 3 is an exploded rear perspective view of the housing, the washer spring and the bezel in isolation.
Figure 4A:
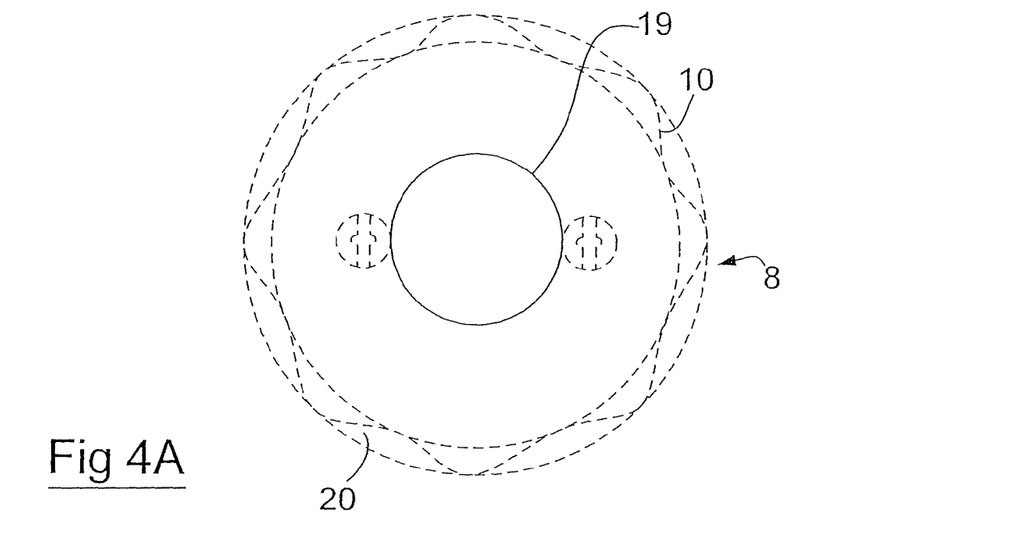
FIG. 4a is a top plan view of the housing.
Figure 4B:
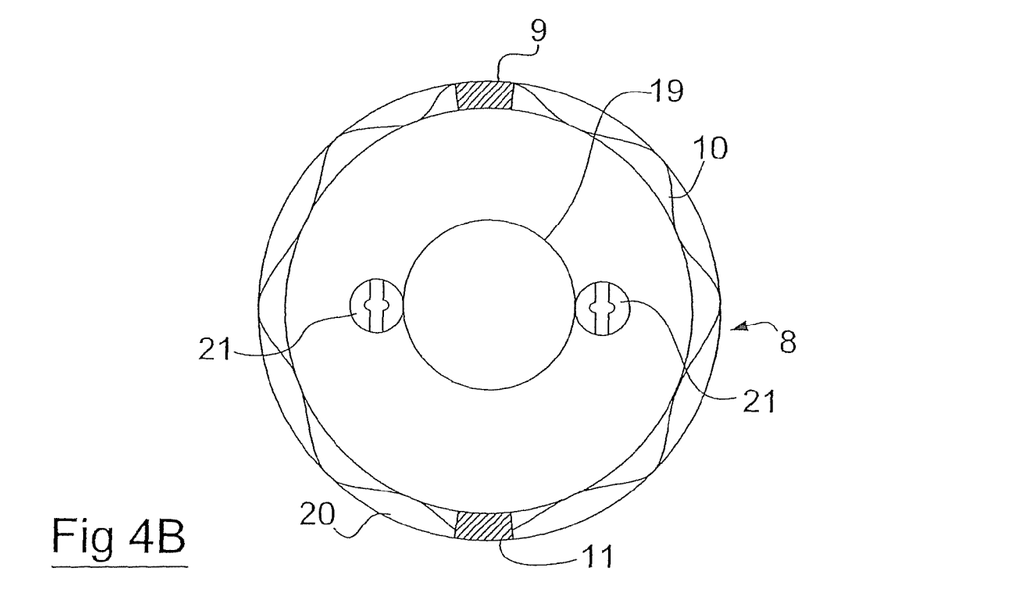
FIG. 4b is a bottom plan view of the housing.
Figure 4C:
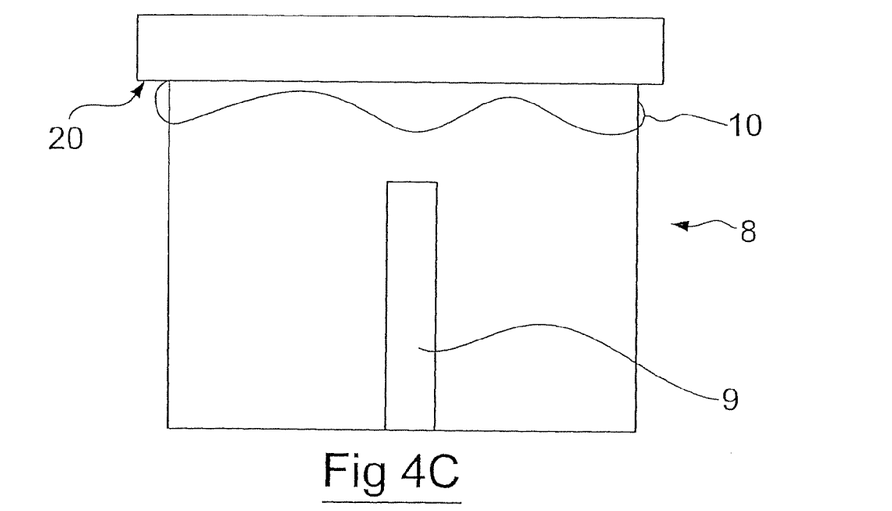
FIGS. 4c and 4d are elevation views showing side profiles of the housing.
Figure 4D:
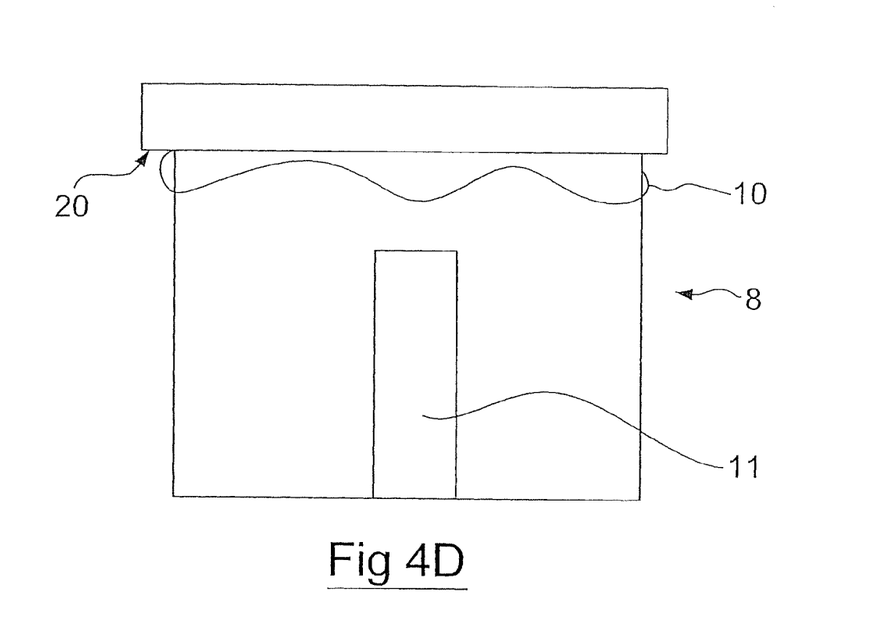

The washer spring 10, the housing 8 and the bezel 6 may hereinafter be referred to collectively as a switch attachment assembly 7, which is shown in isolation in FIG. 3. The housing 8 as described above, comprises the flange 20 and ribs 9 and 11 and is generally cylindrical in shape to complement the circular aperture or opening 1. Also shown in FIG. 3 is an inner cylindrical sleeve 19 for receiving the switch 12 and a pair of mounting holes 21 for the screws 14. It can be seen in FIG. 3 that the washer spring 10 may be slid over an outer cylindrical sleeve 54 which supports the ribs 9, 11, and seated against the flange 20 of the housing 8.

Figure 5A:
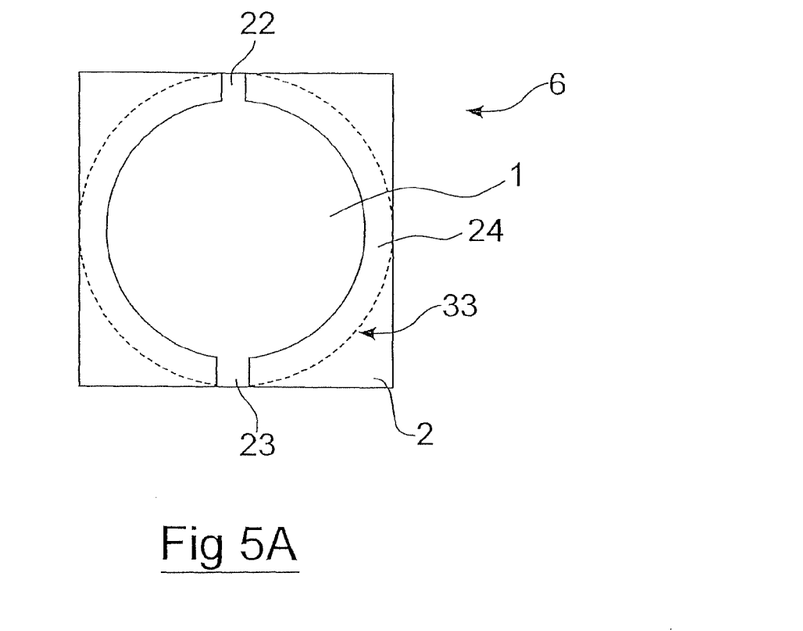
FIG. 5a is a top plan view of the bezel.

The assembly of the washer spring 10 on the housing 8 is shown in additional detail using various views in FIGS. 4a through 4d. It can be seen in FIGS. 4a through 4d that, when seated, the washer spring 10 provides a resilient force between the flange 20 and the landing 24 of the bezel 6 during installation. The washer spring 10 installed on the extended flange 20 and above the ribs 9 and 11 can be seen in FIGS. 4c and 4d. It may also be noted that the ribs 9 and 11 vary in width to mate with the slots 22 and 23 of the bezel 6 which are shown in FIG. 5a to ensure a proper alignment of the bezel 6 and the housing 8. The mounting holes 21 can also be seen in greater detail in FIG. 4b.

Figure 5B:
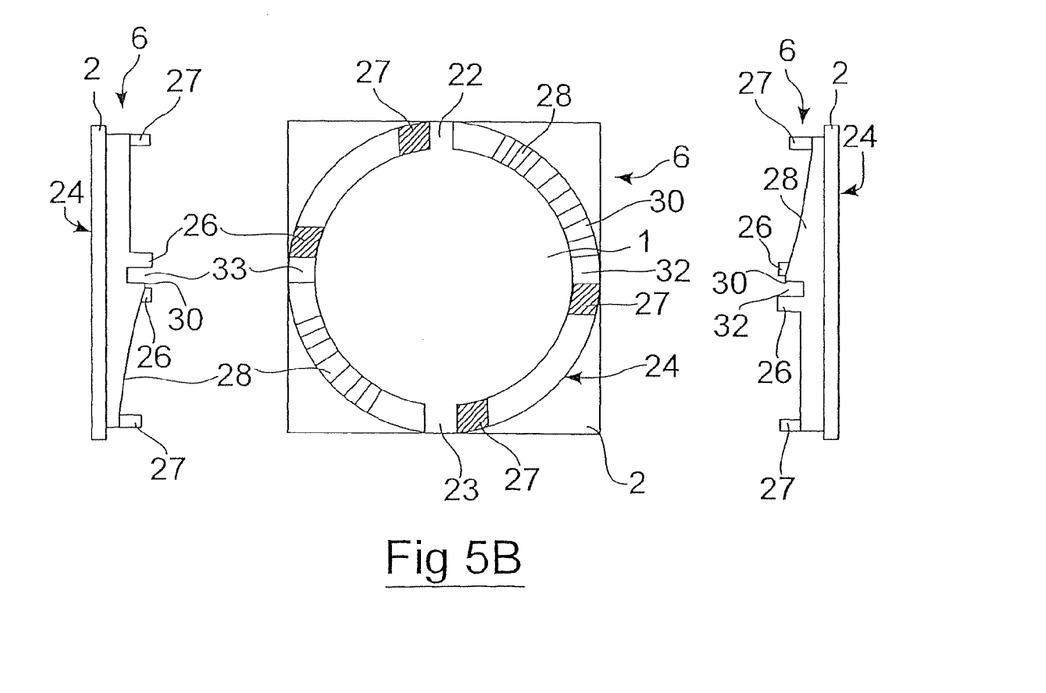
FIG. 5b shows a bottom plan view of the bezel and elevation views to each side.

Referring now to FIG. 5b and FIG. 3, further detail of the bezel 6 will now be described. The landing 24, which can be seen in FIG. 5b faces outwardly towards the housing 8 and ultimately the spring 10 and flange 20. A circumferential profiled portion forming a ridge or wall 34 skirts the inwardly facing surface of the panel 2 and surrounds the opening 1. The profile of the wall 34 guides the housing 8 in the bezel 8 during installation as will be explained in greater detail below. Beginning at 12 o'clock, the narrow slot 22 can be seen, which is formed in the wall 34 and has adjacent thereto, a first of a pair of first guide posts 27. Moving clockwise (as seen in FIG. 3), a first ramp 28 is formed in the rim of the wall 34 and terminates at a first ledge 30. The first ledge 30 carries the profile into a first notch 32 at 3 o'clock. A first of a second pair of guide posts 26 is formed on the opposite side of the first notch 32. Continuing to move clockwise, the wall 34 continues to the second of the first pair of guide posts 27. The wide slot 23 is formed on the other side of the second guide post 27 at 6 o'clock as can be seen in FIG. 3. Continuing to move clockwise, a second ramp 28 begins after the wide slot 23, and similar to the first ramp 28, terminates at a ledge 30 which carries the profile into a second notch 33 at 9 o'clock. On the other side of the second notch 33 is the second of the second pair of guide posts 26. The wall 34 completes its circumferential sweep between the second guide post 26 and the first guide post 27 of the other pair.

It can thus be seen that the wall 34 comprises a pair of opposite quadrants having a ramp 28 extending from a slot 22, 23 to a notch 32, 33. As will be illustrated below, the location of the first pair of posts 27 prevents the housing 8 from being rotated in one direction but permits rotation towards the ramps 28 and ultimately the notches 32, 33. Similarly, the second pair of posts 26 limits rotation of the housing 8 such that it cannot be rotated further then the notches 32, 33 whereby the ends of ribs 9, 11 are guided into the notches 32, 33. It will be appreciated that the orientation of the posts 26, 27 with respect to the slots 22, 23 and notches 32, 33 and the direction of the ramps 28 may instead be reversed to permit rotation of the housing 8 in the opposite direction during installation.

It can also be seen in FIG. 3 that there is provided a one-to-one mating of the slots 22 and 23 with the complementary ribs 9 and 11 to prevent installation of the switch assembly in an improper orientation. This may be advantageous where the orientation of the switch 12 is important to its functionality and/or where the knob 4 needs to be properly aligned with markings on the dashboard 2. The one-to-one mating is achieved in this example by varying the width of each of the complementary rib-slot pairs, for example, the complementary pair of rib 9 and slot 22 is smaller in width than the rib 11 and its corresponding slot 23 as shown in this example. It will be appreciated that the number of rib-slot pairs may vary according to the application and only two are shown for simplicity. The housing 8 can thus be inserted into the bezel 6 by aligning the ribs 9 and 11 with slots 22 and 23 in the landing 24 of the bezel 6. The installation of switch 12 into the proper orientation is achieved by rotating the housing 8 once it has been inserted through the opening 1 as illustrated in FIGS. 6a through 6e whereby the profile of the wall 34 of the bezel 6, as described above, causes the housing 8 to resiliently mate with the bezel 6 and thus the panel 2 by having the washer spring 10 interposed therebetween.

Figure 6A:
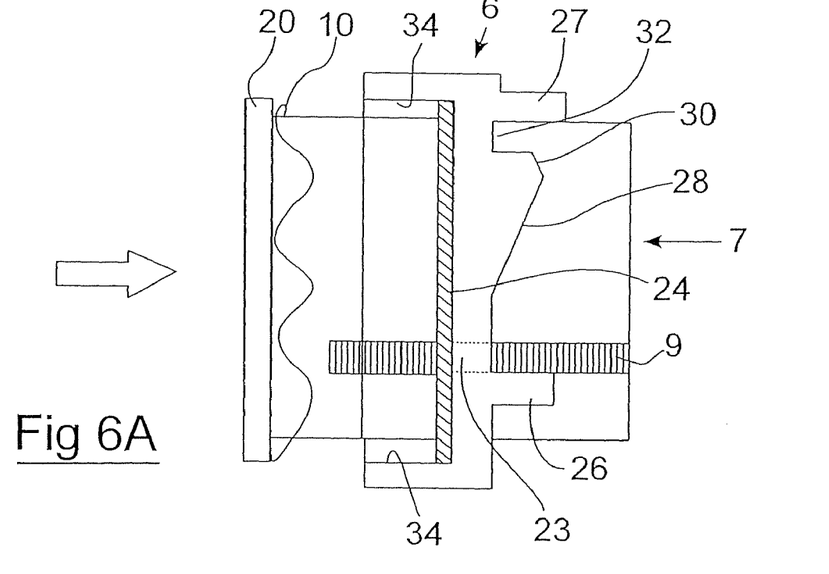
FIGS. 6a through 6e illustrate a series of installation operations for inserting the housing into the bezel.
Figure 6B:
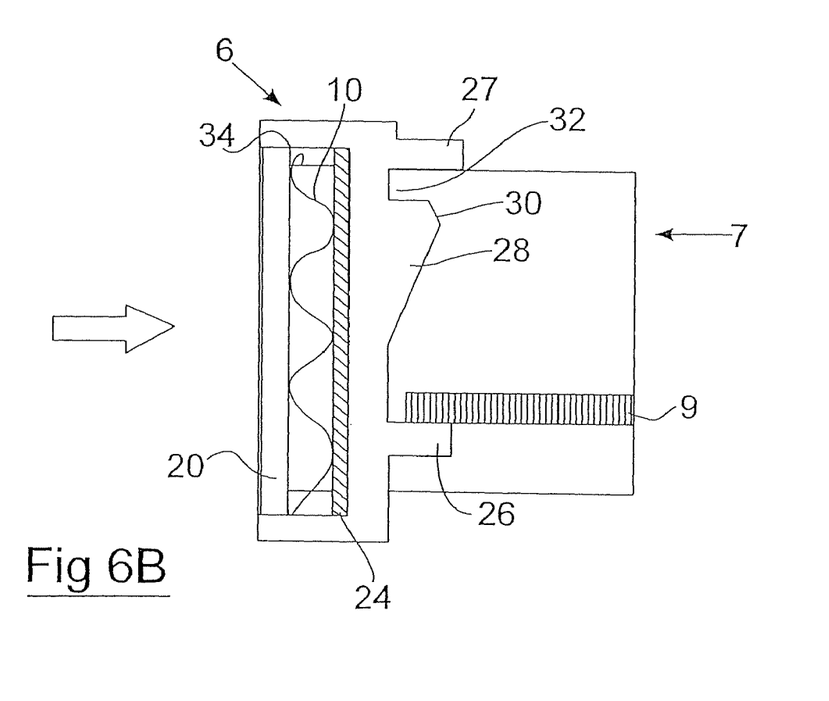
Figure 6C:
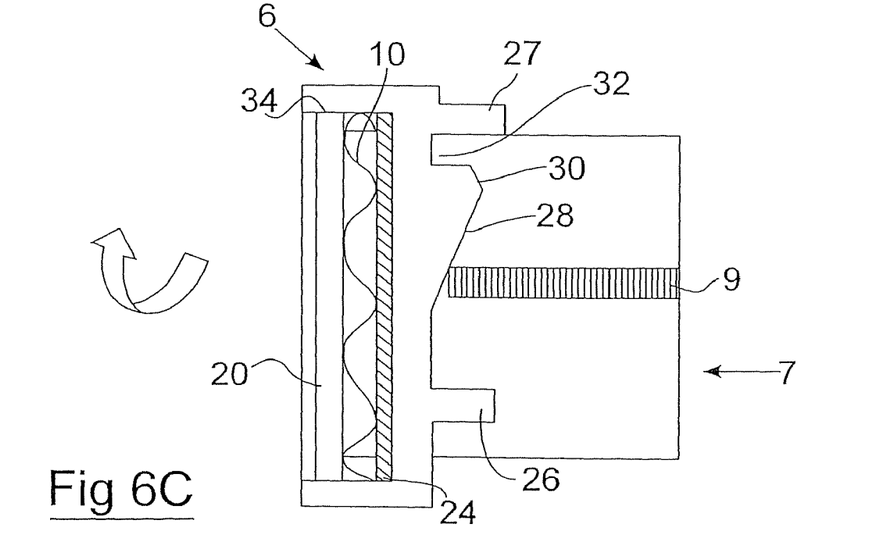
Figure 6D:
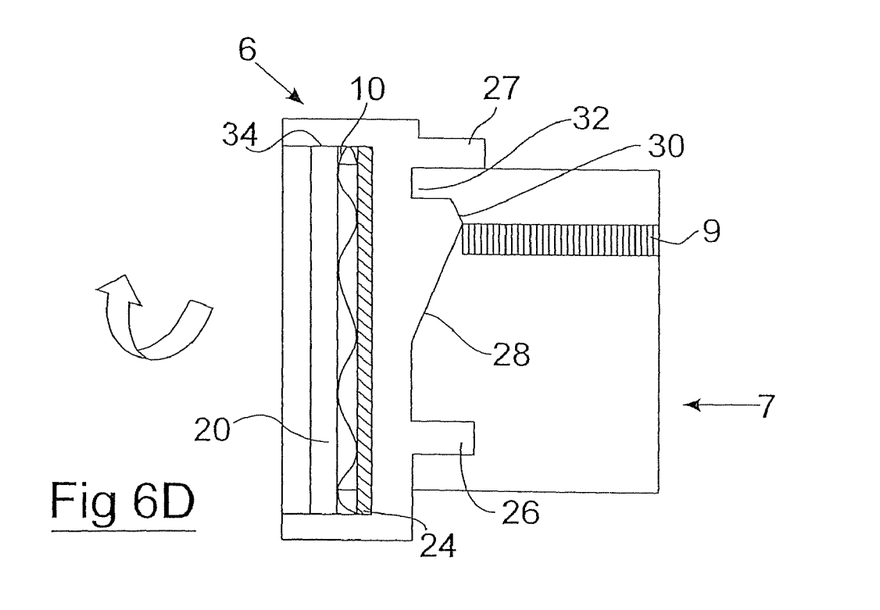
Figure 6E:
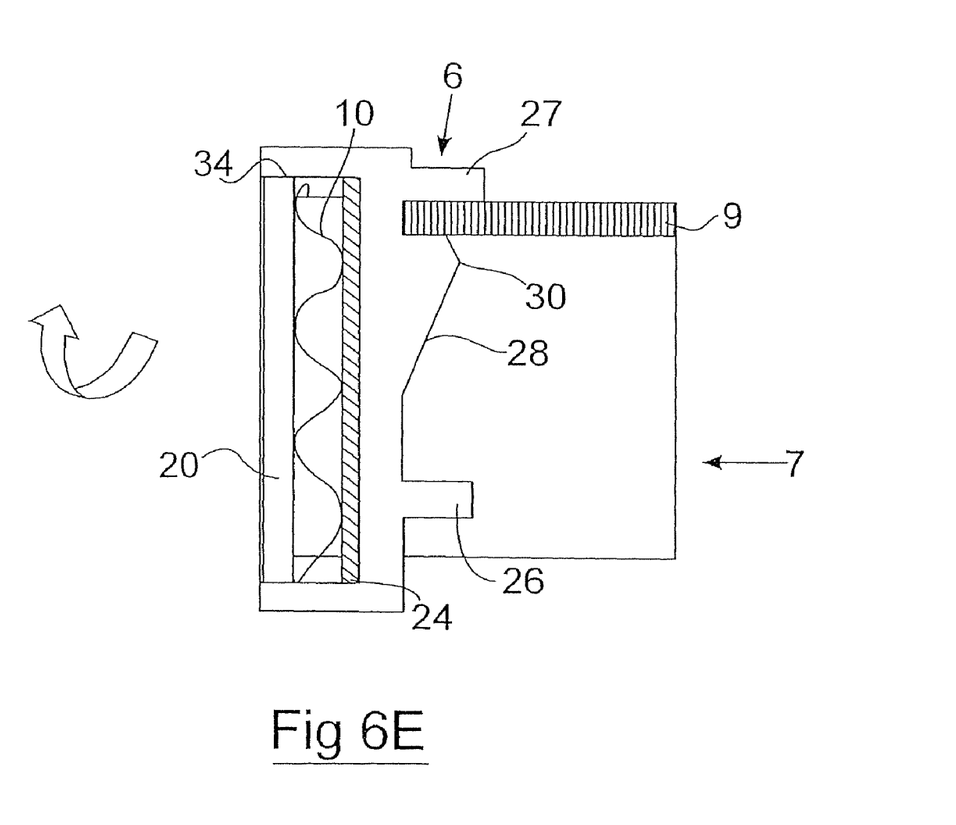

Referring first to FIG. 6a, it can be seen that prior to inserting the housing 8 into the opening 1, the washer spring 10 is fit over and around the housing 8 such that it rests against the flange 20 as described above. The housing 8 may then be inserted into the opening 1 in the bezel 6 such that the complementary rib-slot pairs are aligned as described above, of which the narrow rib 9 can be seen in FIG. 6a as it passes through the narrow slot 23. During this operation, the post 26 seen in FIG. 6a only allows for rotation towards the ramp 28. The housing 8 may then be inserted further through the bezel 6 until the ribs 9, 11 clear the landing 34 as shown in FIG. 6b, which further compresses the washer spring 10. Once the ribs 9, 11 clear the landing 34, the housing 8 is then able to be rotated with respect to the bezel 6 in the direction of the notches 32 and 33 as seen in FIG. 6c. The ramps 28 facilitate a smooth rotation of the housing 8 with respect to the bezel 6. During rotation, as the ribs 9 and 11 move over the ramps 28, which increase in height with respect to the landing 34, the washer spring 10 is compressed between the landing 24 of the bezel 6 and the flange 20 of the housing 8 as also seen in FIG. 6d. The ramps 28 end at the ledge 30, which in this example is bevelled to further guide the ribs 9 and 11 into the notches 32 and 33 as shown in FIG. 6e.

As the ribs 9, 11 are guided into the notches 32, 33, the housing 8 moves axially with respect to the bezel 6 under an opposing force provided by the washer spring 10. The washer spring 10 thus maintains the axial position of the housing 8 with respect to the bezel 6 as seen in FIG. 6e and aligns the flange 20 and the upper edge of the wall 34 to maintain a substantially flush surface between the housing 8 and the panel 2. When the ribs 9, 11 are seated in the notches 32 and 33 rotational movement of the housing 8 with respect to the bezel 6 is also inhibited by the posts 27 and ledges 30. Accordingly, it can be seen that the washer spring 10 compresses during installation and expands to a relaxed state once the housing 8 is installed as well as maintains a relative positioning of housing 7 and the bezel 6. When installed, the washer spring 10 also inhibits rattling from external vibrations and the housing 8 should maintain the configuration shown in FIG. 6e until the application of an axial force as will be described below.

To remove the switch 12 from the panel 2 for replacement or repair, the housing 8 can be pushed towards the panel 2 (e.g. by pushing the knob towards the panel 2) until the ribs 9 and 11 are released from the notches 32 and 33. Thereafter, the housing 8 is rotated in the direction of the slots 22 and 23 (i.e. opposite to the direction of rotation during installation), until the rib-slot pairs are aligned. The posts 26 assist in aligning the housing 8 during removal, by inhibiting movement of the ribs 9 and 11 beyond the slots 22, 23. The housing 8 may then be pulled out through the bezel 6 and the switch 12 removed as would be understood from FIG. 2. It will be appreciated that the resiliency of the washer spring 10 (or equivalent resilient member) can be varied to provide a suitable amount of force to inhibit rattling and avoid inadvertent disassembly. The nature of the resilient member can be suited to the application based on size, cost and required force and the washer spring 10 is only one example.

It can be seen that the housing 8 can be installed and removed without the use of any tools and avoids the need to remove the dashboard or panel 2 to access the switch 12.

Although the above examples are described with respect to specific embodiments, it will be appreciated that various other embodiments may be implemented without departing from the scope of the claims as described below.

The invention claimed is:

1. A switch attachment assembly for facilitating installation and removal of a switch from a panel comprising: a bezel configured to be integrated into said panel, said bezel comprising a circular aperture; and a cylindrical switch housing configured to support said switch, said housing sized to be received through said aperture; wherein said aperture and said housing comprise complementary flanges to limit axial movement of said housing through said aperture, said assembly further comprising a resilient member interposed between said flanges; wherein one of said bezel and said housing comprises a profiled portion, and the other of said bezel and said housing comprises at least one protrusion to interact with said profiled portion during rotation of said housing, when said housing is inserted into said aperture, to secure said housing in said bezel; wherein said resilient member stabilizes said housing with respect to said bezel when secured in said bezel.

2. The assembly according to claim 1 wherein a first of said complementary flanges extends into said aperture and comprises a corresponding slot sized to permit passage of each said at least one protrusion, said at least one protrusion extending radially from said housing, said profiled portion being formed on an inner side of said first flange such that said at least one protrusion engages said profiled portion upon clearing said first flange and upon said rotation of said housing.

3. The assembly according to claim 2 wherein said profiled portion comprises a post adjacent said at least one corresponding slot to restrict rotation of said housing in one direction by interfering with a respective one of said at least one protrusion.

4. The assembly according to claim 3 wherein said profiled portion comprises at least one notch sized to receive corresponding ones of said at least one protrusion after said rotation of said housing to secure said housing in said bezel.

5. The assembly according to claim 4 wherein said profiled portion is sloped between said at least one corresponding slot and said at least one notch to compress said resilient member during rotation of said housing and subsequently separate said complementary flanges when said at least one protrusion is received in a corresponding notch.

6. The assembly according to claim 4 wherein said profiled portion comprises a post adjacent said at least one notch to limit said rotation and guide said at least one protrusion into corresponding ones of said at least one notch.

7. The assembly according to claim 2 comprising a pair of protrusions diametrically opposite and extending axially along said housing.

8. The assembly according to claim 7 wherein said pair of protrusions are differently sized to ensure alignment of said housing with respect to said bezel.

9. The assembly according to claim 7 wherein said pair of protrusions are axially spaced from a second of said complementary flanges extending from one end of said housing to accommodate said profiled portion upon rotation of said housing.

10. The assembly according to claim 1 wherein said resilient member is a wavy washer type spring sized according to the circumference of said housing and so as to extend no further than the extent of a first of said complementary flanges extending from said housing.

11. The assembly according to claim 2 comprising a pair of slots diametrically opposite.

12. The assembly according to claim 11 wherein said pair of slots are differently sized to ensure alignment of said housing with respect to said bezel.

13. The assembly according to claim 1 wherein said housing comprises an aperture for receiving said switch.

14. A bezel configured to be integrated in a panel, said bezel comprising a circular aperture sized to receive a cylindrical switch housing configured to support a switch, said bezel for enabling installation and removal of said housing from said panel, said bezel comprising a flange for interacting with a complementary flange on said housing to limit axial movement of said housing through said aperture, said flange comprising at least one slot for permitting passage of at least one protrusion on said cylindrical switch housing, said bezel comprising a profiled portion for interacting with said at least one protrusion on said cylindrical switch housing during rotation of said cylindrical switch housing when said cylindrical switch housing has been inserted into said aperture to secure said housing in said bezel, wherein said profiled portion comprises at least one ramp for interacting with said at least one protrusion to urge said cylindrical switch housing towards said bezel during rotation of said cylindrical switch housing within said aperture, and at least one corresponding notch adjacent to said ramp to receive said at least one protrusion.

15. The bezel according to claim 14, wherein said profiled portion comprises a post adjacent said at least one slot to restrict rotation of said cylindrical switch housing in one direction by interfering with a respective one of said at least one protrusion.

16. The bezel according to claim 14, comprising a pair of slots for a pair of corresponding protrusions on said cylindrical switch assembly.

17. The bezel according to claim 16, wherein said slots are differently sized.

18. The bezel according to claim 14, wherein said bezel comprises an aperture to permit passage of at least a portion of said switch.

19. The bezel according to claim 14, further comprising a resilient member sized to be seated between said flange and said complementary flange.

* * * * *